United States Patent [19]
Akatsuka et al.

[11] Patent Number: 5,685,783
[45] Date of Patent: Nov. 11, 1997

[54] GOLF CLUB SHAFT

[75] Inventors: Tsuneo Akatsuka, Saitama-ken; Yoshihiro Motoki, Misato; Takashi Harada, Soka; Akira Suzawa, Koshigaya, all of Japan

[73] Assignee: Somar Corporation, Japan

[21] Appl. No.: 623,113

[22] Filed: Mar. 28, 1996

[30] Foreign Application Priority Data

Jul. 27, 1995 [JP] Japan .................. 7-211254
Dec. 27, 1995 [JP] Japan .................. 7-354301

[51] Int. Cl.⁶ .................................. A63B 53/10
[52] U.S. Cl. ............... 473/319; 473/323; 273/DIG. 7; 273/DIG. 23
[58] Field of Search ............... 473/316, 317, 473/318, 319, 320, 321, 322, 305, 310, 282, 287, 219; 273/DIG. 7, DIG. 23

[56] References Cited

U.S. PATENT DOCUMENTS

| | | | |
|---|---|---|---|
| 3,998,458 | 12/1976 | Inoue et al. | 473/319 |
| 4,000,896 | 1/1977 | Lauraitis | 473/319 |
| 4,132,579 | 1/1979 | Van Auken | 473/319 |
| 4,135,035 | 1/1979 | Branen et al. | 473/319 |
| 4,157,181 | 6/1979 | Cecka | 473/319 |
| 4,757,997 | 7/1988 | Roy et al. | 473/319 |
| 5,018,735 | 5/1991 | Meredith et al. | 473/318 |
| 5,251,896 | 10/1993 | Gerlach | 473/317 |
| 5,265,872 | 11/1993 | Tennent et al. | 473/320 |
| 5,551,691 | 9/1996 | Harada | 473/323 |

*Primary Examiner*—Sebastiano Passaniti
*Attorney, Agent, or Firm*—Lorusso & Loud

[57] ABSTRACT

A golf club shaft is formed of a fiber-reinforced plastic is disclosed which has a constant inside diameter of at least 7 mm between the tip end and a point G1 and a varying inside diameter increasing from the point G1 to a point G2, wherein G1 and G2 are located at positions spaced apart from the tip end distances equal to 20–50% and 70–100% of the length of the shaft, respectively. The shaft has a constant outer diameter of at least 8 mm between the tip end and a point H1 which is spaced apart from the tip end a distance equal to 20–170 mm, a varying outer diameter decreasing from H1 a point F1 which is spaced apart from the tip end a distance equal to 10–45% of the shaft, a constant diameter from F1 to a point F2 which is spaced apart from F1 a distance equal to 0–300 mm and a varying outer diameter increasing from F2 to a point H2 which is spaced apart from the grip end a distance equal to 0–300 mm.

8 Claims, 2 Drawing Sheets

GOLF CLUB SHAFT

BACKGROUND OF THE INVENTION

This invention relates to a golf club shaft formed of a fiber-reinforced plastic and to a golf club using the shaft.

Hollow golf club shafts formed of a fiber-reinforced plastic are now increasingly used. In assembling, the tip end of the shaft is inserted into and fixed to a hosel of a golf club head with an adhesive. Since the shaft is generally shaped so that the outer diameter decreases from the grip end to the tip end, the torsional rigidity of the shaft is relatively small in the tip end. Thus, the golf club is swung to hit a ball, the tip end portion of the shaft is twisted so that the shot direction becomes unstable. Such unstability in the shot direction increases with an increase of the head speed.

The torsional rigidity can be increased by increasing the outer diameter of the shaft. U.S. Pat. No. 5,265,872 discloses a golf club shaft having such an enlarged lower section. As shown in FIG. 3, the prior art shaft has a hosel section 101 adjacent to a tip end 103 thereof and a lower flare section 102. The outer diameter of the lower flare section 102 increases in the direction from a grip end to the tip end 103 and is maximum at its junction 104 with the hosel section 101. The outer diameter of the hosel section 101 decreases from the junction 104 to the tip end 103. The hosel section 101 of the shaft is received in a hosel 105 of a golf club head with the widest diameter portion 104 being located at or slightly below the tip end of the hosel 105. Designated as 106 is an adhesive with which the hosel section 101 of the shaft is bonded to the hosel 105 of the club head. As a result of the above construction, the torsional strength and resistance to breakage at the top end of the hosel 105 are increased. However, this structure requires a specifically designed hosel. Therefore, ordinary golf club heads having a hosel with an inside diameter smaller than the maximum diameter of the lower flare section 102 are not usable for the specific club shaft.

SUMMARY OF THE INVENTION

It is an object of the present invention to provide a golf club shaft which is devoid of the drawbacks of the conventional techniques.

Another object of the present invention is to provide a golf club which flexes in the desired manner and gives good swing feelings to a player.

In accomplishing the foregoing objects, there is provided in accordance with the present invention a hollow golf club shaft formed of a fiber-reinforced plastic and having a tip end and a grip end spaced apart from said tip end a distance equal to 810–1,300 mm, said golf club shaft comprising in adjacent order from said tip end to said grip end a tip section, a first intermediate section, a minimum torsional rigidity section, a second intermediate section, and a grip section;

said golf club shaft having a kick point located at a position spaced apart from said tip end a distance equal to 40–47% of the length from said tip end to said grip end;

said golf club shaft having a constant inside diameter of at least 7 mm between said tip end and a first point G1 and a varying inside diameter increasing from said first point G1 to a second point G2;

said first point G1 being located at a position spaced apart from said tip end a distance equal to 20–50% of the length from said tip end to said grip end;

said second point G2 being located at a position spaced apart from said grip end a distance equal to 0–30% of the length from said tip end to said grip end;

said tip section having a constant outer diameter of at least 8 mm;

said first intermediate section having varying outer diameter decreasing from its junction H1 with said tip section to its junction F1 with said minimum torsional rigidity section;

said junction H1 being located at a position between said tip end and said first point G1 and spaced apart from said tip end a distance equal to 20–170 mm;

said junction F1 being spaced apart from said tip end a distance equal to 10–45% of the length from said tip end to said grip end;

said minimum torsional rigidity section having a length of 0–300 mm;

said second intermediate section having varying outer diameter increasing from its junction F2 with said minimum torsional rigidity section to its junction H2 with said grip section; and said junction H2 being spaced apart from said grip end a distance equal to 0–300 mm.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
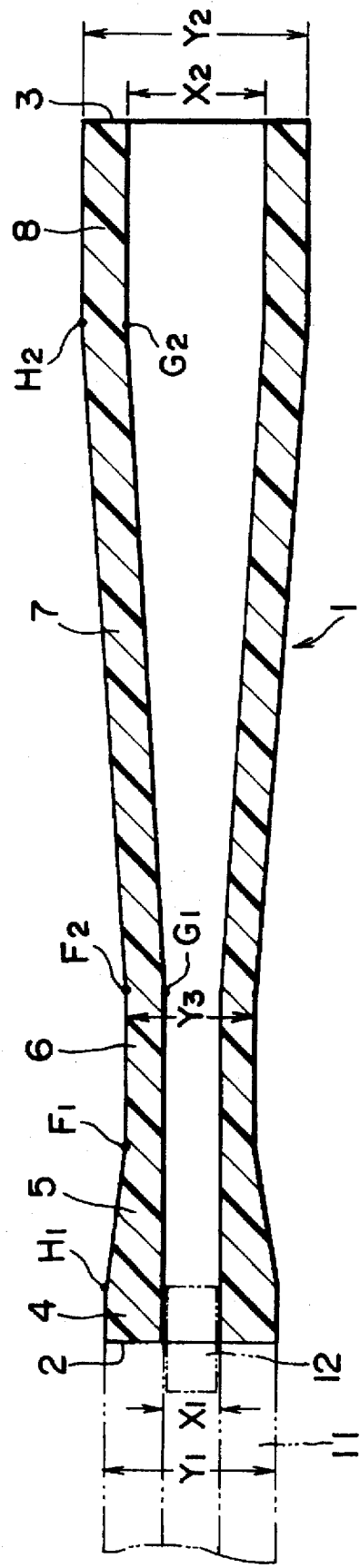
FIG. 1 is a sectional view schematically showing a golf club shaft according to the present invention.

Referring now to FIG. 1, designated generally as 1 is a hollow golf club shaft formed of a fiber-reinforced plastic. Any reinforcing fiber conventionally used for fiber-reinforced plastic golf club shafts may be used for the purpose of the present invention. The reinforcing fiber may be, for example, a glass fiber, a carbon fiber, a Kebler fiber (polyaromatic amide fiber), a boron fiber, a ceramic fiber or a combination of these fibers. The plastic may be a thermosetting resin such as an epoxy resin. The shaft 1 may be prepared in any known manner such as by sheet winding and/or filament winding. In the sheet winding method, prepreg sheets each having a resin matrix in which reinforcing fibers are dispersed and generally uniaxially oriented are wound around a mandrel.

The shaft 1 has a tip end 2 and a grip end 3 and a total length from the tip end 2 to the grip end 3 of 810–1,300 mm. In the case of an iron golf club shaft, the length is preferably 810–1,070 mm, more preferably 860–1,050 mm. A wood golf club shaft preferably has a length of 960–1,300 mm, more preferably 1,060–1,170 mm.

A tip section 4 adapted for connection with a hosel 11 of an iron or a wood club head extends from the tip end 2 to a junction H1 thereof with an adjacent first intermediate section 5. The first intermediate section 5 thus extends from the junction H1 to a junction F1 thereof with an adjacent minimum torsional rigidity section 6 which in turn extends from the junction F1 to a junction F2 at which the minimum torsional rigidity section 6 abuts an adjacent second intermediate section 7. The second intermediate section 7 extends from the junction F2 to its junction H2 with an adjacent a grip section 8. The grip section 8 terminates at the grip end 3 and is adapted to receive a hand grip surrounding at least a portion of an outer surface of the grip section 8. While these sections 4 through 8 represent slightly different structures, it will be understood that they are all part of the unitary shaft and are not separate components which must be joined.

The tip section 4 has a length, i.e. axial distance between the tip end 2 to the junction H1, of 20–170 mm, preferably 25–100 mm, a constant outer diameter Y1 of at least 8 mm and a constant inner diameter X1 of at least 7 mm.

The first intermediate section 5 has varying outer diameter decreasing from the junction H1 to the junction F1. The junction F1 is located at a position spaced apart from the tip end 2 a distance equal to 10–45%, preferably 13–35%, of the length of the shaft 1. The minimum torsional rigidity section 6 has a length of 0–300 mm, preferably 0–250 mm and a constant outer diameter (Y3). The torsional rigidity of the section 6 is smaller than those of the other sections 4, 5, 7 and 8. It is important that the golf club shaft have a kick point at a position spaced apart from the tip end a distance equal to 40–47%, preferably 42–45%, of the length from the tip end to the grip end. The outer and inner diameters Y3 and X3 of the grip section are generally 8.5–13 mm and 7–10 mm, respectively.

The term "kick point" used herein is intended to refer to a position of a golf club shaft at which the angle of curvature is minimum (deflection in the direction normal to the axis is maximum) when an axial stress is applied to the shaft from both ends thereof. The position of the kick point may be controlled by any known manner such as by controlling the position of the junction H1 and/or the lengths and/or materials of reinforcing layers provided in portions adjacent to the tip and grip ends 2 and 3.

The above specific positions of the minimum torsional rigidity section 6 and the kick point are essential to give the following advantages:

(a) A portion of the torsional stress caused in the shaft as a result of the impact at the golf club head is absorbed in the minimum torsional rigidity section 6 and its vicinity, the impact received by the player is reduced so that the feeling of the shot is excellent.

(b) A high flight height is easily obtained.

(c) The shaft flexes in an optimum manner and gives good swing feelings to the player.

The second intermediate section 7 has a varying outer diameter increasing from the junction F2 to the junction H2.

The grip section 8 may have a constant outer diameter and a length, i.e. axial distance between the grip end 3 to the junction H2, of generally up to 300 mm, preferably 20–200 mm.

The golf club shaft 10 preferably has such an inside surface construction that the inside diameter is constant between the tip end 2 and a first point G1 and increases from the first point G1 to a second point G2. The first point G1 is located on a grip end side from the junction H1 and at a position spaced apart from the tip end a distance equal to 20–50%, preferably 25–45%, of the length from the tip end to the grip end, while the second point G2 is located at a position spaced apart from the grip end a distance equal to 0–30%, preferably 2–20%, of the length from the tip end to the grip end.

Because of the above specific inner diameter structure, the outer diameter of the shaft in the intermediate portion can be retained in the range as that of the ordinary golf club shaft even though the outer diameter at the tip section is much larger than that in the ordinary golf club shaft. Therefore, the flexibility of the shaft is not adversely affected by the use of the large diameter tip section.

The outer and inner diameters of the shaft ranges somewhat differently for the iron and wood shafts. Suitable ranges are as summarized in Table 1 below.

TABLE 1

| | Outer or Inner Diameter (mm) | |
|---|---|---|
| | For Iron | For Wood |
| X1 | 7.5–10 (preferably 8.3–9.5) | 7–9 (preferably 7.5–8.5) |
| Y1 | 10.5–14 (preferably 11–13) | 9–13 (preferably 10–12) |
| X2 | 11.5–13.5 | 11.5–13.5 |
| Y2 | 14–16.5 | 14–16.5 |
| Y3 | 9–13 | 8.5–12 |

The suitable torsional rigidity ranges of respective sections of the shafts for iron and wood clubs are as summarized in Table 2.

TABLE 2

| | Torsional Rigidity ($\times 10^6$ kg · mm$^2$) | |
|---|---|---|
| | For Iron | For Wood |
| Tip Section 4 | 1–10 (preferably 1.5–7) | 1–8 (preferably 1.3–7) |
| Minimum torsional Rigidity Section 5 | >0.8 (preferably >1.0) | >0.8 (preferably >1.0) |
| Grip Section 8 | 3–15 (preferably 3.5–10) | 3–15 (preferably 3.5–10) |

As shown in FIG. 1, the golf club shaft 1 is connected to a tubular hosel section 11 of a club head (not shown). The hosel section 11 has outer and inner diameters substantially the same as those of the tip section 4 of the golf club shaft, respectively. The hosel section 11 is in abutting engagement with and bonded to the tip section 4, with a columnar joint member 12 fitted into and bonded to the hosel section 11 and the tip section 4, so that the golf club shaft 1, the golf club head and the joint member 12 are integrally bound into a unitary structure. The joint member 12 may be a pipe or rod made of a metal such as steel or titanium or a fiber-reinforced plastic such as used for the formation of the shaft.

Figure 2:
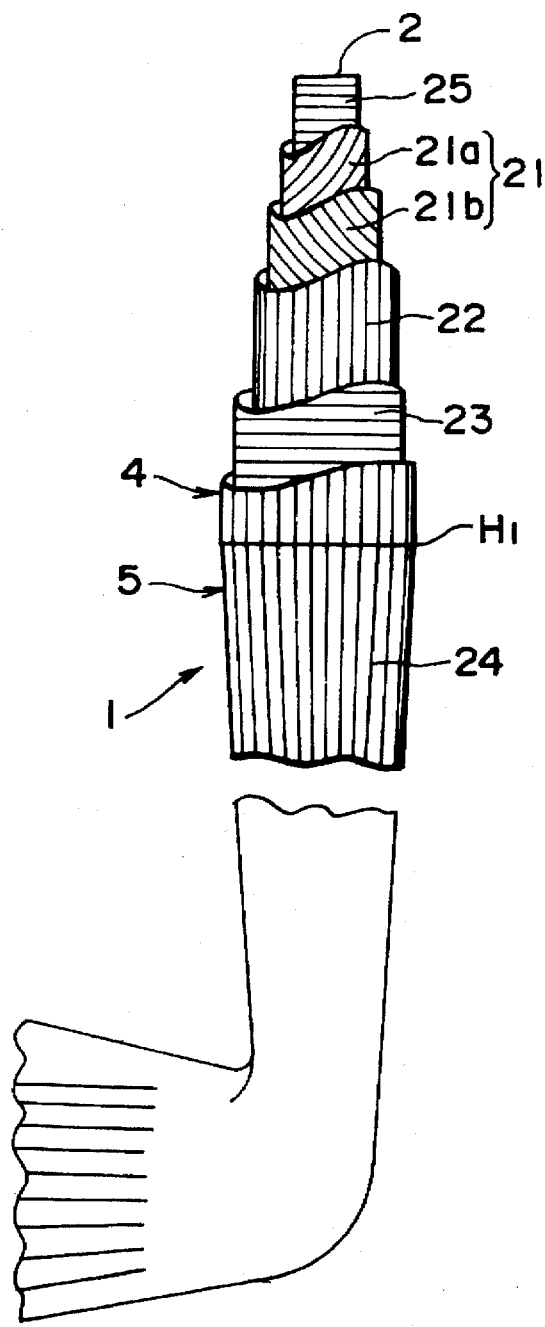
FIG. 2 is a side view, cut away in part, showing the construction and fiber orientation of the layers in a tip portion of a golf club shaft according to the present invention.
Figure 3:
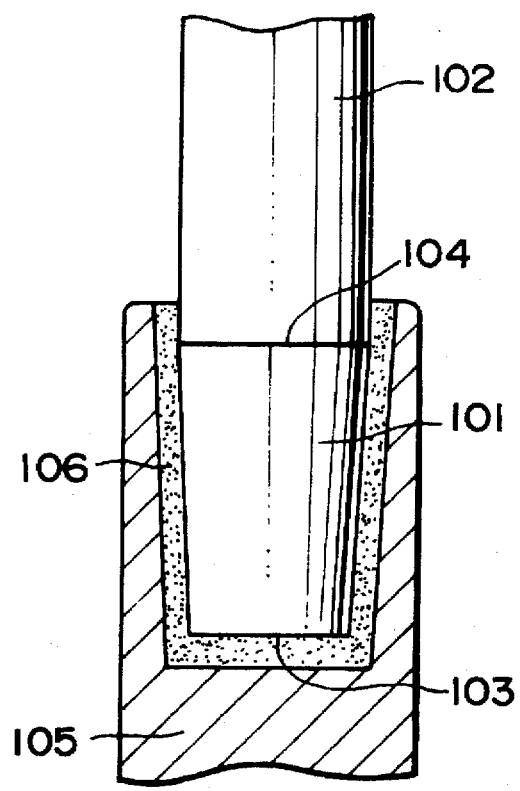
FIG. 3 is a fragmentary sectional view showing a tip part of a known shaft.

Since the tip section 4 of the shaft 1 thus constructed is subjected to an expanding force transmitted from the club head through the joint member 12 upon hitting balls, it is desirable to reinforce the tip section 4. FIG. 2 depicts one preferred embodiment of a fiber-reinforced plastic multi-layer structure of a shaft according to the present invention. This structure can prevent the occurrence of longitudinal cracks of the shaft, while retaining the desired flexibility of the shaft.

The shaft 1 has a tubular bias layer 21 extending continuously between the tip end and the grip end thereof. The layer 21 is composed of a plurality of contiguous, superposed carbon fiber layers 21a and 21b. The fibers of the layers 21a and 21b are oriented at ±θ (θ is generally in the range of 30 to 80 degrees) with respect to the longitudinal axis of the shaft 1. Thus, the adjacent two wound layers 21a and 21b have the same winding angle with each other but the orientation directions of the windings are opposite to each other (symmetrical) with respect to the longitudinal axis of the shaft.

Provided around the bias layer 21 is a tubular, straight layer 22 extending throughout the length of the shaft 1. The straight layer 22 contains carbon fibers oriented substantially in parallel with the longitudinal axis of the shaft 1.

Designated as 23 is a hoop layer provided outside of the straight layer 22 and extending from the tip end 2 to the junction H1 (FIG. 1). The hoop layer 24 is formed of an aromatic amide fiber-reinforced plastic oriented substantially perpendicularly to the longitudinal axis of the shaft 1.

A tubular reinforcing layer 24 is provided outside of the hoop layer 23. The layer 24 extends from the tip end 4 to the junction F1 and is formed of a carbon or glass fiber-reinforced plastic oriented substantially in parallel with the longitudinal axis of the shaft 1.

If desired, an additional hoop layer 25 may be provided inside of the bias layer 21. The layer 25 extends from the tip end 4 to an intermediate portion of the first intermediate section 5 and is formed of a carbon fiber-reinforced plastic oriented normal to the longitudinal axis of the shaft 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A hollow golf club shaft formed of a fiber-reinforced plastic and having a tip end and a grip end spaced apart from said tip end a distance equal to 810–1,300 mm, said golf club shaft comprising in adjacent order from said tip end to said grip end a tip section, a first intermediate section, a minimum torsional rigidity section, a second intermediate section, and a grip section;

said golf club shaft having a kick point located at a position spaced apart from said tip end a distance equal to 40–47% of the length from said tip end to said grip end;

said golf club shaft having a constant inside diameter of at least 7 mm between said tip end and a first point G1 and a varying inside diameter increasing from said first point G1 to a second point G2;

said first point G1 being located at a position spaced apart from said tip end a distance equal to 20–50% of the length from said tip end to said grip end;

said second point G2 being located at a position spaced apart from said grip end a distance greater than zero percent and less than or equal to 30% of the length from said tip end to said grip end;

said tip section having a constant outer diameter of at least 8 mm;

said first intermediate section having varying outer diameter decreasing from its junction H1 with said tip section to its junction F1 with said minimum torsional rigidity section;

said junction H1 being located at a position between said tip end and said first point G1 and spaced apart from said tip end a distance equal to 20–170mm;

said junction F1 being spaced apart from said tip end a distance equal to 10–45% of the length from said tip end to said grip end;

said minimum torsional rigidity section having a length greater than zero mm and less than or equal to 300 mm;

said second intermediate section having varying outer diameter increasing from its junction F2 with said minimum torsional rigidity section to its junction H2 with said grip section; and said junction H2 being spaced apart from said grip end a distance greater than zero mm and less than or equal to 300 mm.

2. A golf club shaft as claimed in claim 1, wherein the distance between said tip end and said grip end is 810–1,070 mm, wherein said tip section has an inner diameter of 7.5–10 mm, an outer diameter of 10.5–14 mm and a torsional rigidity of between $10^6$ kg·mm$^2$ and $10^7$ kg·mm$^2$, wherein said minimum torsional rigidity section has a torsional rigidity of greater than $0.8 \times 10^6$ kg·mm$^2$ but is smaller than that of said tip section, and wherein said grip section has a torsional rigidity of between $3 \times 10^6$ kg·mm$^2$ and $1.5 \times 10^7$ kg·mm$^2$.

3. A golf club shaft as claimed in claim 2, wherein the distance between said tip end and said grip end is 860–1,050 mm, wherein said tip section has a torsional rigidity of between $3 \times 10^6$ kg·mm$^2$ and $10^7$ kg·mm$^2$, wherein said minimum torsional rigidity section has a torsional rigidity of between $2 \times 10^6$ kg·mm$^2$ and $7 \times 10^6$ kg·mm$^2$ and is smaller than that of said tip section, and wherein said grip section has a torsional rigidity of between $7 \times 10^6$ kg·mm$^2$ and $1.5 \times 10^7$ kg·mm$^2$.

4. A golf club shaft as claimed in claim 1, wherein the distance between said tip end and said grip end is 960–1,300 mm, wherein said tip section has an inner diameter of 7–9 mm, an outer diameter of 9–13 mm and a torsional rigidity of between $10^6$ kg·mm$^2$ and $8 \times 10^6$ kg·mm$^2$, wherein said minimum torsional rigidity section has a torsional rigidity of greater than $0.8 \times 10^6$ kg·mm$^2$ but is smaller than that of said tip section, and wherein said grip section has a torsional rigidity of between $3 \times 10^6$ kg·mm$^2$ and $1.5 \times 10^7$ kg·mm$^2$.

5. A golf club shaft as claimed in claim 4, wherein the distance between said tip end and said grip end is 1,060–1,170 mm, wherein said tip section has a torsional rigidity of between $2.5 \times 10^6$ kg·mm$^2$ and $7 \times 10^6$ kg·mm$^2$, wherein said minimum torsional rigidity section has a torsional rigidity of between $1.5 \times 10^6$ kg·mm$^2$ and $6 \times 10^6$ kg·mm$^2$ and is smaller than that of said tip section, and wherein said grip section has a torsional rigidity of between $7 \times 10^6$ kg·mm$^2$ and $1.5 \times 10^7$ kg·mm$^2$.

6. A golf club shaft as claimed in claim 1, comprising:

a tubular bias layer extending continuously throughout the length of said shaft and including a plurality of contiguous, superposed carbon fiber layers oriented at $\pm \theta$ degrees, where $\theta$ is in the range of 30 to 80 degrees, with respect to the longitudinal axis of said shaft;

a tubular straight layer provided around said bias layer and extending throughout the length of said shaft and including carbon fibers oriented substantially in parallel with the longitudinal axis of said shaft;

a tubular hoop layer provided outside of said straight layer and extending from said tip end to said junction H1, said hoop layer including aromatic amide fibers oriented substantially perpendicularly to the longitudinal axis of said shaft; and a tubular reinforcing layer provided outside of said hoop layer and extending from said tip end to said junction F1, said reinforcing layer including carbon or glass fibers oriented substantially in parallel with the longitudinal axis of said shaft.

7. A golf club shaft as claimed in claim 6, further comprising an additional hoop layer provided inside of said bias layer and extending from said tip end to an intermediate portion of said first intermediate section, said additional hoop layer including carbon fibers oriented substantially perpendicularly to the longitudinal axis of said shaft.

8. A golf club shaft as claimed in claim 1, further comprising:

a golf club head provided with a tubular hosel section having outer and inner diameters substantially the same as those of said tip section of said golf club shaft, respectively, said hosel section being in abutting engagement with and bonded to said tip section; and a columnar joint member fitted into and bonded to said hosel section and said tip section, so that said golf club shaft, said golf club head and said joint member are integrally bound into a unitary structure.

* * * * *